United States Patent
Eilers et al.

(10) Patent No.: US 12,215,803 B2
(45) Date of Patent: Feb. 4, 2025

(54) VALVE TRIM

(71) Applicant: FISHER CONTROLS INTERNATIONAL LLC, Marshalltown, IA (US)

(72) Inventors: Daniel J. Eilers, Marshalltown, IA (US); Michael A. Wyatt, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 18/111,521

(22) Filed: Feb. 17, 2023

(65) Prior Publication Data

US 2023/0194017 A1    Jun. 22, 2023

Related U.S. Application Data

(62) Division of application No. 17/224,857, filed on Apr. 7, 2021, now Pat. No. 11,585,463.

(51) Int. Cl.
*F16K 47/14* (2006.01)

(52) U.S. Cl.
CPC ................................ *F16K 47/14* (2013.01)

(58) Field of Classification Search
CPC ...................................................... F16K 47/14
See application file for complete search history.

(56) References Cited

U.S. PATENT DOCUMENTS

| 3,722,854 A | 3/1973 | Parola |
| 4,108,210 A | 8/1978 | Luthe et al. |
| 6,766,826 B2 | 7/2004 | Baumann |
| 10,487,961 B2 | 11/2019 | Eilers et al. |
| 2021/0095786 A1 | 4/2021 | Barron et al. |

*Primary Examiner* — Eric Keasel
(74) *Attorney, Agent, or Firm* — MARSHALL, GERSTEIN & BORUN LLP

(57) ABSTRACT

A fluid flow control device include a valve body including an inlet, an outlet, and a passageway extending between the inlet and the outlet. A valve trim is at least partially disposed in the passageway of the valve body. The valve trim includes a restrictor having a wall and a plurality of passages extending through the wall. A diffuser is coupled to the restrictor and including a porous body. The porous body is adjacent to the plurality of passages of the restrictor.

18 Claims, 8 Drawing Sheets

VALVE TRIM

FIELD OF DISCLOSURE

The present disclosure relates to a control valve, and more particularly, to a valve trim having a diffuser for a control valve.

BACKGROUND

In process control systems, such as distributed or scalable process control systems commonly found in chemical, petroleum, power generation, or other industrial processes, it is often necessary to reduce the pressure of a fluid. In some cases, the pressure of the fluid must be reduced significantly. In cases requiring a relatively high pressure reduction, the pressure drop ratio, which is the change in pressure divided by the inlet pressure, may be quite high.

Generally speaking, pressure reduction typically leads to increased levels of unwanted noise and/or vibration. In applications with a relatively high pressure drop ratio, these problems can be even more pronounced. In an attempt to prevent or at least reduce noise and vibration, process systems often use flow restriction devices to reduce the pressure drop ratio and also to reduce the fluid pressures. Such flow restriction devices include, for example, valve trims, diffusers, and silencers.

Known valve trims are, however, typically made of materials that are highly susceptible to high pressure drops and blockage attributable to the fluid flowing therethrough. This is particularly true when these valve trims are employed in dirty service applications (i.e., applications involving severe flow conditions, e.g., catalyst fines in refineries, magnetite in power plants, sand in oil production, in which the fluid is dirty). Indeed, when the fluid flowing through one of these valve trims is dirty (e.g., includes particulates), the fluid tends to quickly clog the passages and erode the valve trim. In turn, frequent maintenance is required, which can be quite costly and may necessitate that the process control system (or a portion thereof) be shutdown.

SUMMARY

The exemplary valve trim assemblies described herein may substantially reduce the impact of broad band shock associated noise (BBSAN) created when valve flow reach high fluid velocities. In a first exemplary aspect, a fluid flow control device may include a valve body including an inlet, an outlet, and a passageway extending between the inlet and the outlet. A valve trim may be at least partially disposed in the passageway of the valve body. The valve trim may include a restrictor having a wall and a plurality of passages extending through the wall. A diffuser may be coupled to the restrictor and may include a porous body. The porous body may be adjacent to the plurality of passages of the restrictor.

In a second exemplary aspect, a valve trim for use in a fluid flow control device may include a restrictor defined by a first wall and a second wall coupled to the first wall. The first wall may be spaced radially inward of the second wall. A plurality of first flow characterizing passages may be formed in the restrictor and may extend between the first wall and the second wall. A diffuser may have a porous body coupled to the second wall of the restrictor. A plurality of second flow characterizing passages may be formed in the porous body of the diffuser.

In a third exemplary aspect, a method of manufacturing a valve trim for use in a fluid flow control device may include creating a diffuser, by additive manufacturing. The diffuser may include a first surface, a second surface, a porous body, and a plurality of pathways extending between the first surface and second surface. The method may include coupling the first surface of the diffuser to a wall of a restrictor. The restrictor may include a plurality of passages extending through the wall of the restrictor. The method may include aligning the diffuser and the restrictor such that at least one of the plurality of pathways of the diffuser is in fluid communication with at least one of the plurality of passages of the restrictor.

According to one or more of the foregoing first, second, and third exemplary aspects, a fluid flow device, a valve trim, and/or a method of manufacturing a valve trim may include one of the following preferred aspects.

In a preferred form, the diffuser may include a plurality of pathways adjacent to the plurality of passages of the restrictor.

In a preferred form, at least one of the plurality of pathways of the diffuser may be aligned with at least one of the plurality of passages of the restrictor.

In a preferred form, at least one of the plurality of pathways of the diffuser may be in fluid communication with one of the plurality of passages of the restrictor.

In a preferred form, an average diameter of the plurality of pathways of the diffuser may be different than an average diameter of the plurality of passages of the restrictor.

In a preferred form, an average diameter of the plurality of pathways may be greater than an average diameter of the plurality of passages.

In a preferred form, at least one of the plurality of pathways of the diffuser may taper between a first surface adjacent the restrictor and a second surface spaced from the restrictor.

In a preferred form, the at least one of the plurality of pathways may taper in a direction from the first surface to the second surface.

In a preferred form, the restrictor may be a portion of a valve cage.

In a preferred form, a wall of the valve cage may include a solid portion adjacent to a portion with the plurality of passages extending through the wall.

In a preferred form, the porous body may be a lattice structure formed of a plurality of triply periodic surfaces.

In a preferred form, the diffuser may be fixedly attached to the restrictor.

In a preferred form, the diffuser may be integrally formed with the restrictor.

In a preferred form, at least one of a plurality of second flow passages may be coupled to at least one of a plurality of first flow characterizing passages.

In a preferred form, at least one of the plurality of second flow characterizing passages of the diffuser may taper between a first surface of the diffuser adjacent to the second wall of the restrictor and a second surface of the diffuser spaced from the second wall of the restrictor.

In a preferred form, at least one of the plurality of second flow characterizing passages of the diffuser may taper in a direction toward the second surface of the diffuser.

In a preferred form, the at least one of the plurality of second flow characterizing passages of the diffuser may taper in a direction toward the first surface of the diffuser.

In a preferred form, creating a diffuser may include forming the porous body by creating a lattice structure having a plurality of triply periodic surfaces that form the plurality of pathways of the diffuser.

DETAILED DESCRIPTION

Figure 1:
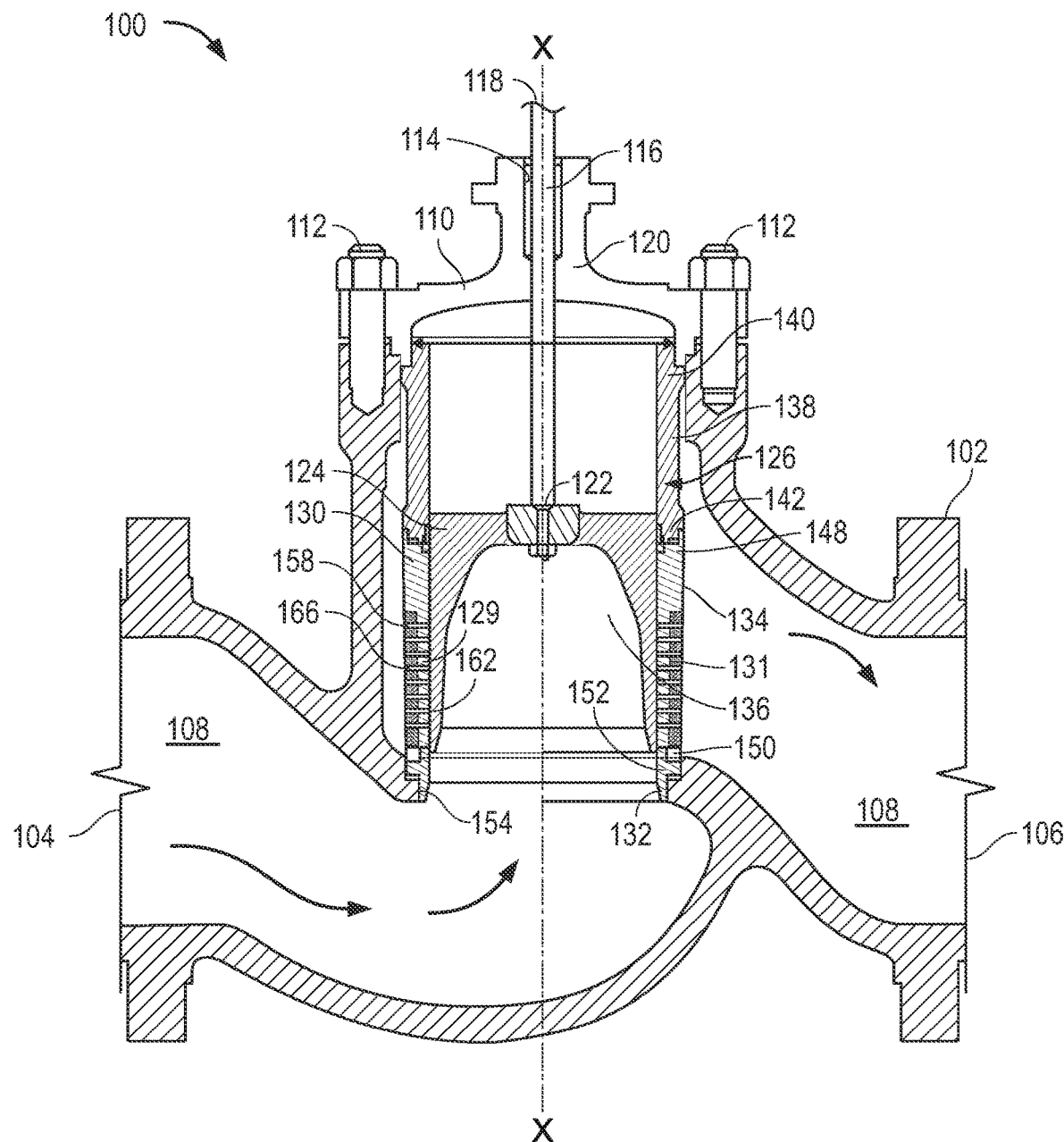
FIG. 1 is a cross-sectional view of a first exemplary control valve with a first exemplary valve trim assembly assembled in accordance with the teachings of the present disclosure.

In FIG. 1, a first exemplary fluid valve 100 is constructed in accordance with the teachings of the present disclosure. The valve 100 has a valve body 102 having an inlet 104, an outlet 106, and a fluid flow path or passageway 108 connecting and extending between the inlet 104 and the outlet 106. A bonnet 110 is coupled to the valve body 102 via a plurality of fasteners 112 and includes a bore 114 to receive a stem 116. An end 118 of the stem 116 extends from a bonnet body 120 and is operatively coupled to an actuator (not shown), and an opposite end 122 of the stem 116 is coupled to a control member 124 (e.g., a valve plug).

A valve trim assembly 126 of the first exemplary fluid valve 100 includes a restrictor component 129 of a cage 130 and a diffuser 131. In the illustrated example, the trim assembly 126 also includes a seat ring 132 defining a valve seat. The cage 130 includes a cylindrical cage body or wall 134 and a central cavity 136 defined by the body 134. In the example illustrated in FIG. 1, the valve trim assembly 126 includes a cage retainer 138 that is separate and distinct from the cage 130. However, in other examples, the cage 130 and the cage retainer 138 may be formed as a single unitary structural element. The valve trim assembly 126 is disposed in the flow path and interacts with the control member 124 to control the flow of fluid through the valve body 102. For example, the trim assembly 126 may provide guidance for the fluid control member or valve plug 124 as the valve plug 124 moves in the central cavity 136 of the cage 130 between an open position, in which the control member 124 is spaced away from the valve seat 132, and a closed position, in which the control member 124 engages the valve seat 132. In FIG. 1, the valve 100 is shown in the closed position.

The trim assembly 126 may be used to condition the flow of fluid, reduce noise, cavitation, and turbulence through the control valve 100. When the control valve 124 is in the open position, fluid flows from the valve inlet 104, passes through the passage 108 between the valve seat 132 and the valve plug 124, passes through the trim assembly 126 where the fluid flow is conditioned, and exits through the valve outlet 106. In particular, fluid flows through a plurality of flow paths 158 of the valve trim 126. In particular, fluid flows through the restrictor 129, which includes a plurality of first flow characterizing passages 162 (also referred herein as "passages") formed in the wall 134 of the cage 130, and a plurality of second flow characterizing passages 166 (also referred herein as "pathways") formed in the diffuser 131. Together, the first and second flow characterizing passages 162, 166 of the valve trim 126 form the pathways 158 that may reduce noise produced as high velocity fluid passes through the valve 100. Put differently, the trim assembly 126 includes at least two different portions for reducing noise (1) the restrictor 129, which is the solid section of the cage 130 with passages 162, and (2) the diffuser 131, which is the porous section of the cage 130 with the plurality of pathways 166. As used herein, the term "restrictor" may refer to a portion of a cylindrical cage, attenuator, or other valve component to restrict fluid flow. Accordingly, a wall or a surface of a cage may be the same as a wall or a surface of the restrictor, and a wall or a surface of the attenuator may be the same as a wall or a surface of the restrictor.

Generally, an end 140 of the cage retainer 138 is positioned at least partially within the valve body 102 and adjacent the bonnet 110, and an opposing end 142 of the cage retainer 138 engages a first end 148 of the cage 130 such that the cage retainer 138 and the cage 130 are coaxially aligned. The cage 130 is positioned within the valve body 102 such that opposing steps or shoulders 150 and 152 of the cage 130 and the seat 132 (e.g., a seat ring) engage and/or interlock to secure the seat 132 at least partially within an aperture 154 of the valve body 102. In other examples, the cage 130 may be installed in a valve without a cage retainer 138 and/or with an integrally formed cage retainer. Similarly, the valve seat 132 may be integrally formed with the cage 130.

The control valve 100 of FIG. 1 is a flow-up, sliding stem control valve where fluid flows into the control valve 100 through the inlet 104, flows through the cage 130 from the central cavity 136 to an outside of the diffuser 131, and exits the control valve 100 through the outlet 106. In other examples, the valve trim assembly 126 (or components similar to the valve trim assembly 126) may be coupled with other valves 100 such as, for example, a flow-down valve, a rotary control valve (i.e., a butterfly valve), a throttle valve, an isolation valve, a globe valve, or other control valve. Moreover, the components of the control valve 100 (e.g., the valve body 102, the control member 124, and the bonnet 110) can vary from what is depicted herein. For example, the inlet 104, the outlet 106, and the fluid flow path 108 extending therebetween can vary in shape and/or size and yet still perform the intended functionality.

Figure 2:
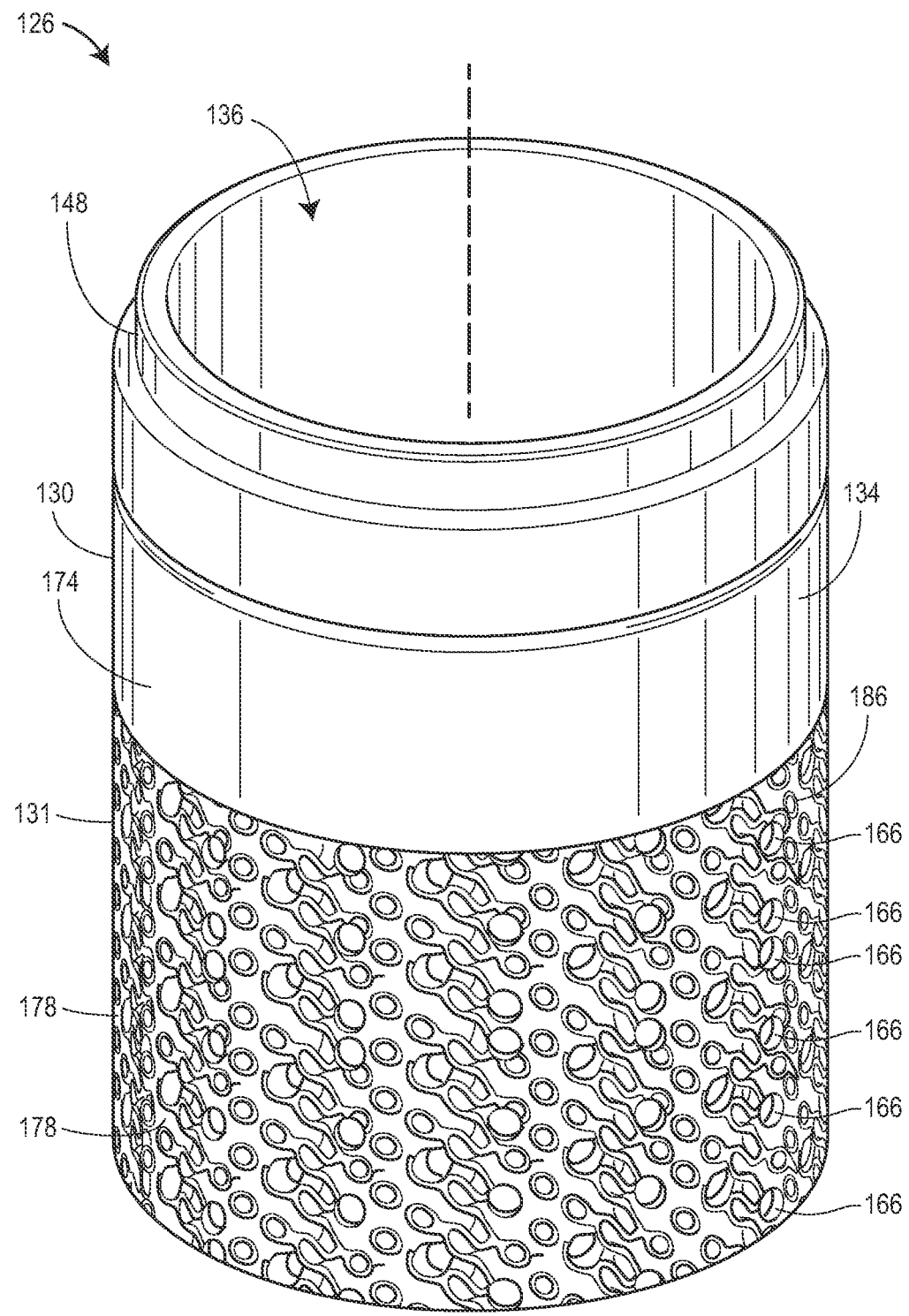
FIG. 2 is a perspective view of the valve trim assembly of FIG. 1.
Figure 3:
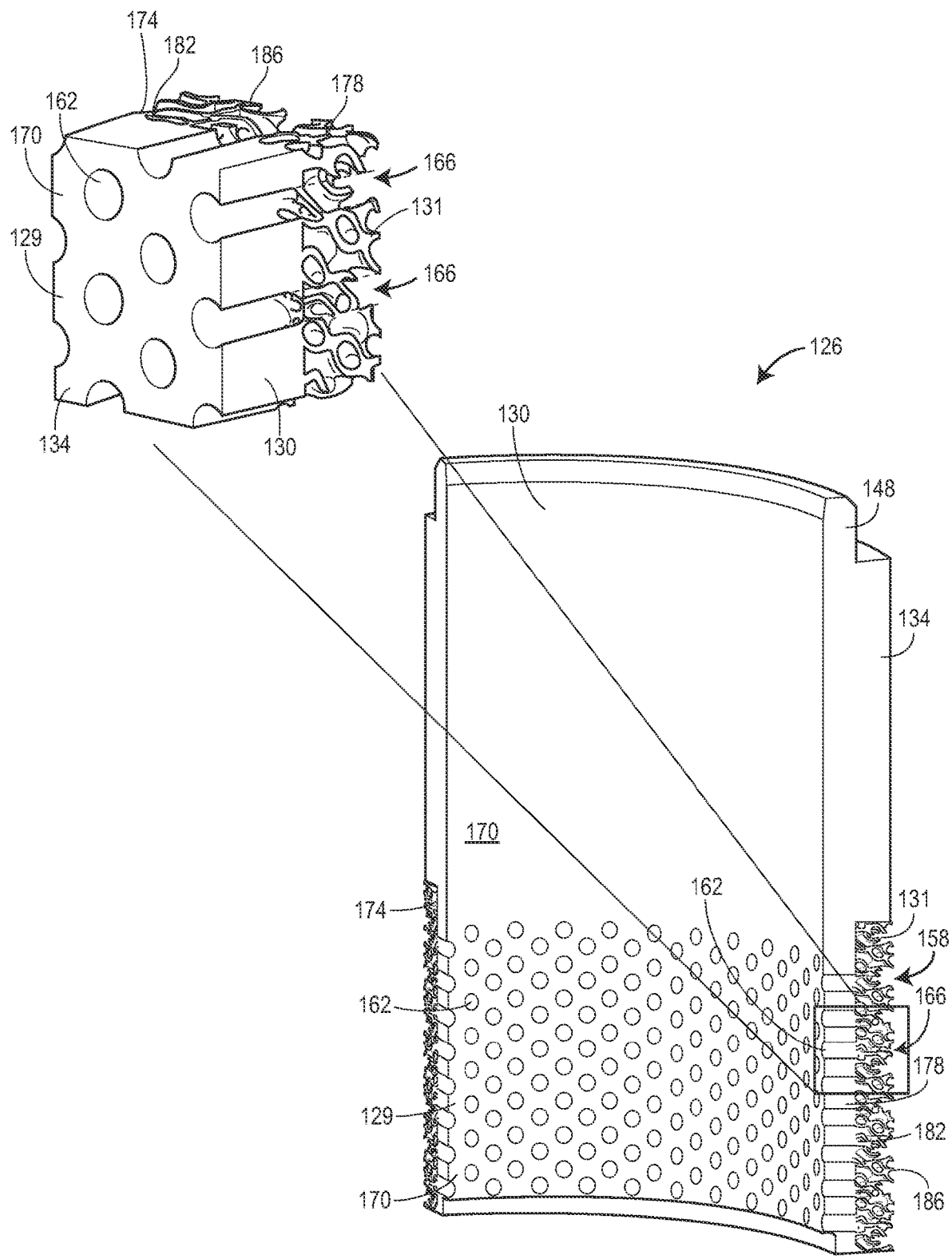
FIG. 3 is a perspective sectional view of an interior of the valve trim assembly of FIG. 1.
Figure 4:
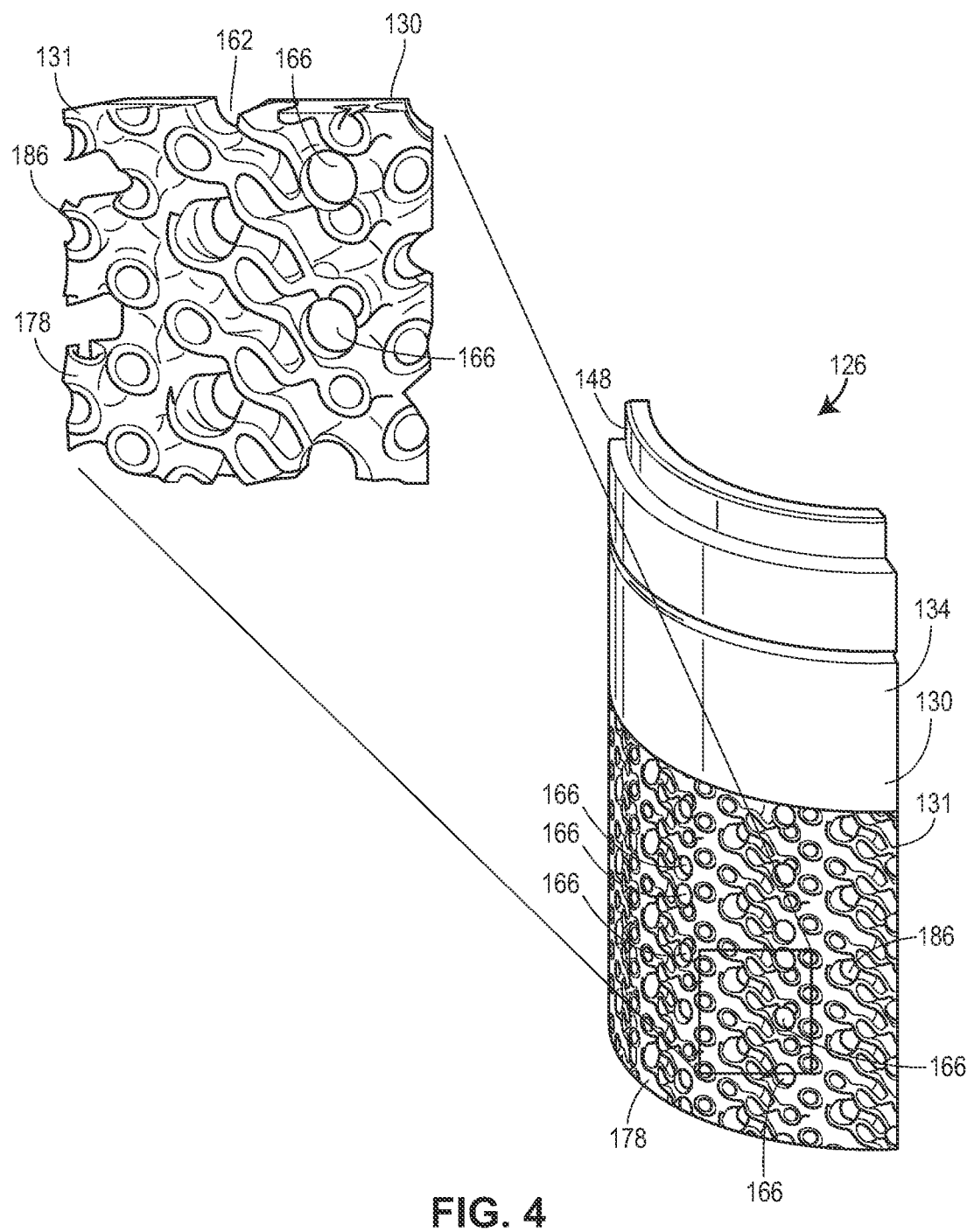
FIG. 4 is a perspective sectional view of an exterior of the valve trim assembly of FIG. 1.

In FIGS. 2-4, the cage 130 and diffuser 131 of the trim assembly 126 are shown in greater detail. The cage 130 includes a first cage wall 170 coupled to a second cage wall 174, which is spaced radially outward of the first cage wall

170. The plurality of passages 162 of the restrictor 129 (FIG. 3) extend linearly through the wall 134 of the cage 130 and between the first and second cage walls 170, 174. The spacing of the passages 162 on the first wall 170 of the cage is used to keep sufficient space between the passages 162 to more evenly distribute fluid flow through the cage 130. The spacing of the passages 162 on the second wall 174 of the cage 130 may be spaced specifically such that the jets of gas that are produced as the gas exits the passages 162 do not converge and produce additional aerodynamic noise.

The diffuser 131 is coupled to the restrictor 129 such that fluid flows through the passages 162 of the cage 130 and into the pathways 166 of the diffuser 131. In particular, the diffuser 131 is adjacent to a stepped portion of the second cage wall 174. The diffuser 131 is a cylindrical sleeve having a porous body 178, a first surface 182, and a second surface 186. The plurality of pathways 166 are formed in the porous body 178 and extend between the first surface 182 and second surface 186 of the diffuser 131. The porous body 178 is disposed adjacent to the plurality of passages 162 of the cage 130 to condition fluid jets exiting the cage 130 and entering the diffuser 131. In the illustrated example, the first surface 182 of the diffuser 131 faces inwardly relative to the cavity 136 of the cage 130, and the second surface 186 faces outwardly away from the cage 130. The plurality of pathways 166 of the diffuser 131 are linearly or axially aligned to the plurality of passages 162 of the restrictor 129 such that fluid can flow straight through the valve trim assembly 126. In the illustrated example, the plurality of pathways 166 of the diffuser 131 are aligned with the plurality of passages 162 of the restrictor 129. In this arrangement, the pathways 166 of the diffuser 131 receive the jets of gas flowing through the passages 162 of the cage 130 and the porous body 178 conditions the flow of the jets to reduce noise.

The porous body 178 of the diffuser 131 may be one of a variety of porous structures. In one example, the porous body 178 is a lattice structure having a plurality of interconnected lattice members. As used herein, the term "lattice structure" may refer to a three-dimensional arrangement or array of connected structural elements (i.e. lattice members or lattice cell units) that may be arranged diagonally, horizontally, and vertically to form a plurality of triangular, diamond, round, rectangular or other polygonal shape openings in a pattern. The lattice structure may also be formed by triply periodic surfaces that are gyroids or gyroid-like. A gyroid is an infinitely connected triply periodic minimal surface that contains no straight lines or planar symmetries. Non-limiting examples of acceptable and exemplary lattice structures of the present disclosure are disclosed in U.S. Pat. No. 10,487,961, the entire contents of which are incorporated herein by reference. In some examples, the openings may together or separately form the plurality of pathways 166 of the diffuser 131. In another example, the pathways 166 may traverse, intersect, or otherwise extend through the array of lattice members and channels 188 formed in the porous body 178. The plurality of lattice members may be separate elements, or the lattice members may be joined together (or formed together) to make an integral structure having a lattice pattern.

In the example shown in FIGS. 2-5, the porous body 178 of the diffuser 131 has a lattice structure formed of a plurality of triply periodic surfaces that form a plurality of channels 188 (most clearly shown in FIG. 5) extending between the first surface 182 and second surface 186 of the diffuser 131. The channels 188 may be used to characterize and/or condition fluid flowing through trim assembly 126 by, for example, reducing the pressure of the fluid as it flows through passages. However, because the passages 162 of the restrictor 129 lead to the pathways 166 of the diffuser 131, flow is directed into these pathways 166 instead of forcing all fluid flow through the channels 188 of the lattice structure 178. Advantageously, particulate in the fluid flowing through the trim assembly 126 passes through the pathways 166 and does not get caught in the channels 188, thereby reducing instances of particulate in the fluid clogging the openings/channels 188 in the lattice structure of the porous body 178. The porous body 178 may be manufactured using Additive Manufacturing Technology. In addition to diffuser 131, other components of the valve trim assembly 126 may also be manufactured using Additive Manufacturing Technology and then assembled together with the diffuser 131. In another example, the entire trim assembly 126 may be manufactured as a single unit using Additive Manufacturing Technology.

Figure 5:
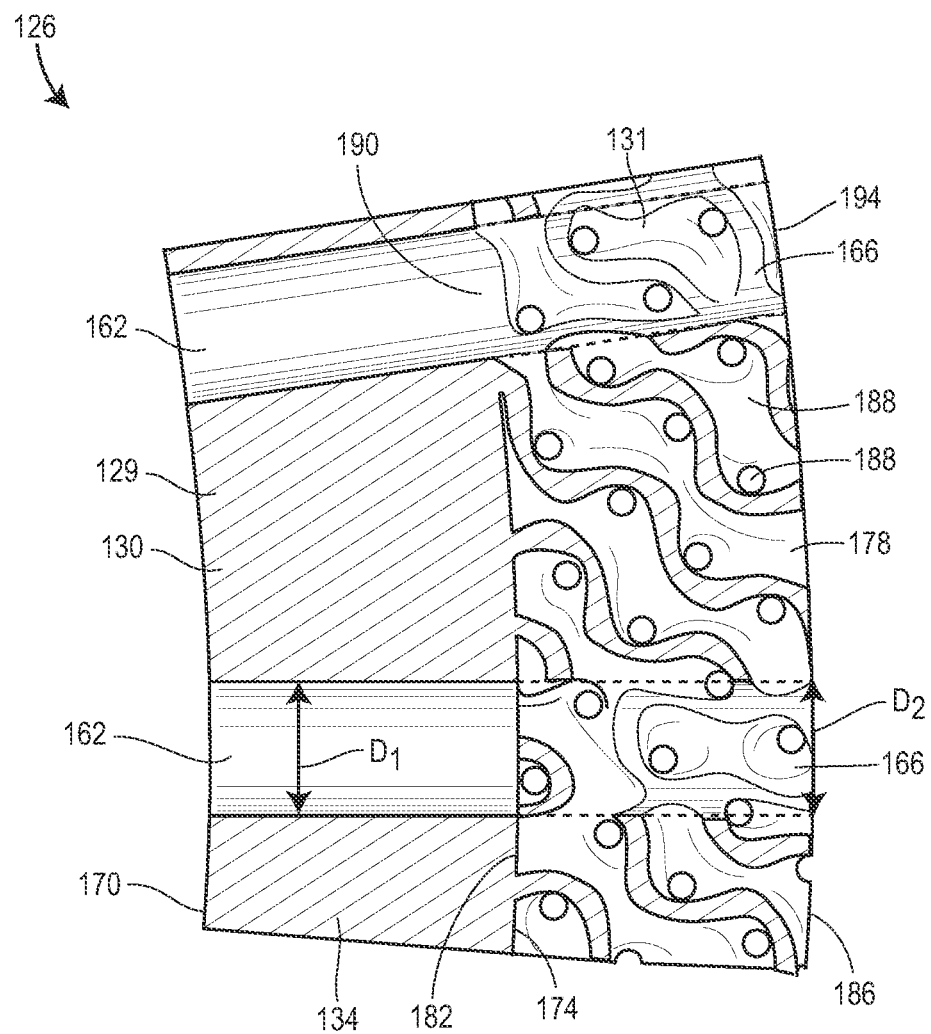
FIG. 5 is a partial, top cross-sectional view of the valve trim assembly of FIG. 1.

As shown in FIG. 5, the first surface 182 of the porous body 178 is coupled to the second wall 174 of the cage body 134. In one example, the diffuser 131 and the cage 130 may be fixedly attached or may be integrally formed as a single component. In another example, the diffuser 131 may be a separate component from the cage 130. In this case, the first surface 182 of the diffuser 131 may be fixedly attached to the second wall 174 of the cage 130. Alternatively, the diffuser 131 may be securely fixed, but not fixedly attached, to the cage 130. The porous body 178 may be formed such that the first surface 182 lays flat against an outer, smooth surface of the second wall 174 of the cage 130. The first surface 182 of the lattice structure 178 of the diffuser 131 may not be entirely smooth or flush, and instead, may be corrugated due to the formation of interconnected lattice structure members.

Also shown in FIG. 5, the plurality of the passages 162 of the cage 130 are aligned with the plurality of the pathways 166 of the diffuser 131. The diffuser 131 is substantially formed of the lattice structure 178 with radial bores 166 extending therethrough to form the pathways 166. In the illustrated example, both the passages 162 of the cage 130 and the pathways 166 of the diffuser 131 are substantially cylindrical bores. A cross-sectional diameter D1 of the passage 162 of the cage 130 is substantially similar to a cross-sectional diameter D2 of the pathway 166 of the diffuser 131. However, in other examples shown in FIGS. 6-9, the passages 162 and the pathways 166 of the trim assembly 126 may be formed differently to condition fluid flow in different ways and to reduce undesirable noise created in the control valve.

Figure 6:
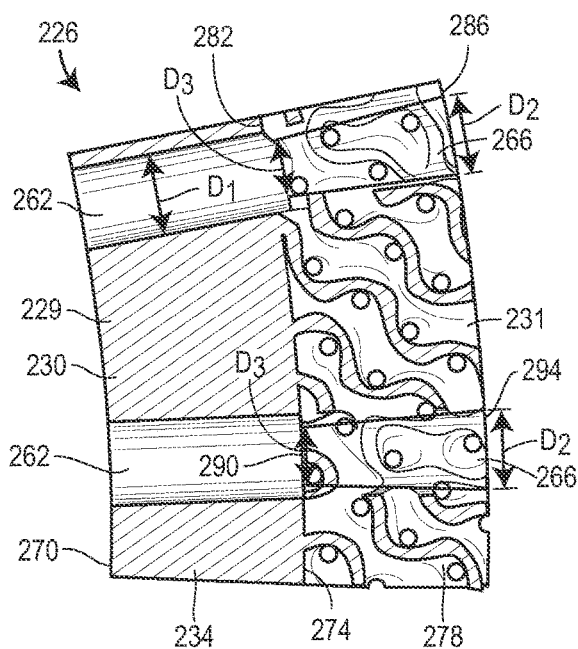
FIG. 6 is a partial, top cross-sectional view of a second exemplary valve trim assembly assembled in accordance with the teachings of the present disclosure.

For example, in FIG. 6, a second exemplary trim assembly 226 may be used with the control valve 100 of FIG. 1, and is constructed in accordance with the teachings of the present disclosure. The second exemplary trim assembly 226 is similar to the first exemplary trim assembly 126 and includes a diffuser 231 coupled to a restrictor 229 of a cage 230 in a way that a plurality of passages 262 of the restrictor 229 are aligned with a plurality of pathways 266 of the diffuser 231. Thus, for ease of reference, and to the extent possible, the same or similar components of the trim assembly 226 will retain the same reference numbers as outlined above with respect to the first exemplary trim assembly 126, although the reference numbers will be increased by 100.

However, the shape of the pathways 266 of the diffuser 231 differs from the uniform shape of the pathways 166 of the diffuser 131 in the first exemplary trim assembly 126. In the example of FIG. 6, the pathways 266 taper from a second surface 286 to a first surface 282 of the diffuser 281. In other words, an opening 290 formed in the first surface 282 of the diffuser 231 has a cross-sectional diameter D3 that is different than a cross-sectional diameter D2 of an opening 294 formed in the second surface 286 of the diffuser 231. Specifically, the cross-sectional diameter D2 of the opening 294 in the second surface 286 is larger than the cross-sectional diameter D3 of the opening 290 in the first surface 282 of the diffuser 231. The change in diameter of the pathways 266 is gradual and makes a tapered shape in which flow enters through a smaller opening 290 in the diffuser 231 than the opening 294 in which flow exits. In this way, flow passes through the passages 262 of the cage 230 having a constant cross-sectional diameter D1 and then flows into the openings 290, with a smaller cross-sectional diameter D3, before exiting the trim assembly 226.

Figure 7:
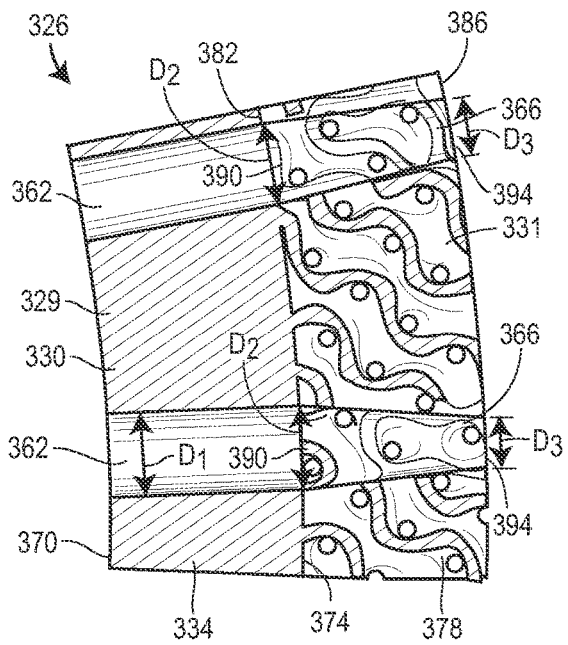
FIG. 7 is a partial, top cross-sectional view of a third exemplary valve trim assembly assembled in accordance with the teachings of the present disclosure.

In FIG. 7, a third exemplary trim assembly 326 may be used with the control valve 100 of FIG. 1, and is constructed in accordance with the teachings of the present disclosure. The third exemplary trim assembly 326 is constructed in accordance with the teachings of the present disclosure. The third exemplary trim assembly 326 is similar to the second exemplary trim assembly 226 and includes a diffuser 331 coupled to a restrictor 329 of a cage 330 in a way that a plurality of passages 362 of the cage 330 are aligned with a plurality of pathways 366 of the diffuser 331. Thus, for ease of reference, and to the extent possible, the same or similar components of the trim assembly 326 will retain the same reference numbers as outlined above with respect to the second exemplary trim assembly 226, although the reference numbers will be increased by 100.

Similar to the pathways 266 of the diffuser 231 in FIG. 6, the pathways 366 of the diffuser 331 in FIG. 7 taper between first and second surfaces 382, 386 of the diffuser 331. However, in this example, the pathways 366 taper from the first surface 382 to the second surface 386 of the diffuser 281. In other words, an opening 390 formed in the first surface 382 of the diffuser 331 has a cross-sectional diameter D2 that is different than a diameter cross-sectional D3 of an opening 394 formed in the second surface 386 of the diffuser 331. Specifically, the cross-sectional diameter D2 of opening 390 in the first surface 382 is larger than the cross-sectional diameter D3 of the opening 394 in the second surface 386 of the diffuser 331. The change in diameter of the pathways 366 is gradual and makes a tapered shape in which flow enters through a larger opening 390 in the diffuser 331 than the opening 394 in which flow exits. In this way, flow passes through the passages 362 of the cage 330 having a cross-sectional diameter D1, into the openings 390 of the diffuser with the same cross-sectional diameter D2, and then exits the trim assembly 326 through the smaller openings 394.

Figure 8:
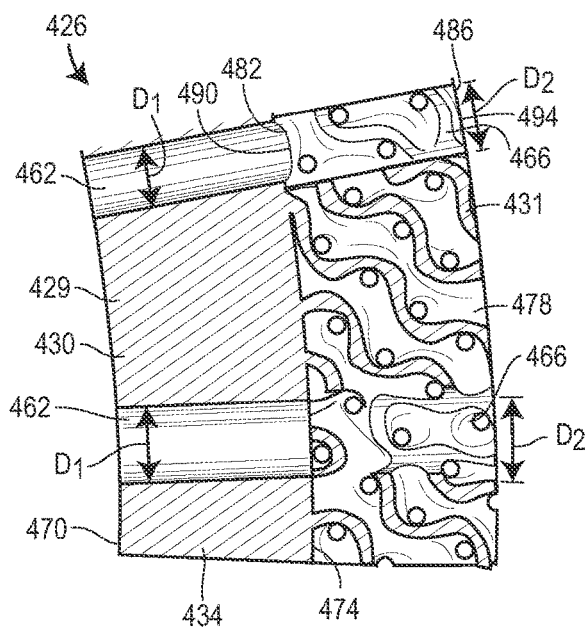
FIG. 8 is a partial, top cross-sectional view of a fourth exemplary valve trim assembly assembled in accordance with the teachings of the present disclosure.
Figure 9:
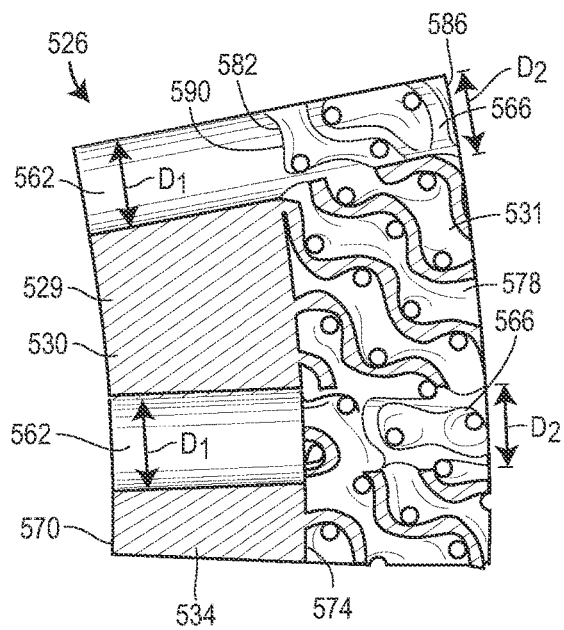
FIG. 9 is a partial, top cross-sectional view of a fifth exemplary valve trim assembly assembled in accordance with the teachings of the present disclosure.

In FIGS. 8 and 9, fourth and fifth exemplary trim assemblies 426, 526 may be used with the control valve 100 of FIG. 1, and are constructed in accordance with the teachings of the present disclosure. The fourth and fifth exemplary trim assemblies 426, 526 are similar to the first exemplary trim assembly 126, and each includes a diffuser 431, 531 coupled to a restrictor 429, 529 of a cage 430, 530 in a way that a plurality of passages 462, 562 of the cage 430, 530 are aligned with a plurality of pathways 466, 566 of the diffuser 431, 531. Thus, for ease of reference, and to the extent possible, the same or similar components of the fourth and fifth trim assemblies 426, 526 will retain the same reference numbers as outlined above with respect to the first exemplary trim assembly 126, although the reference numbers will be increased by 300 and 400, respectively. However, unlike the first exemplary trim assembly 126, a diameter D1 of the passages 462, 562 of the cage 430 is different than a diameter D2 of the pathways 466, 566 of the diffuser 431, 531. In FIG. 8, the first diameter D1 is smaller than the diameter D2. In FIG. 9, the first diameter D1 is larger than the second diameter D2.

As described above, fluid flows through the exemplary trim assemblies 126, 226, 326, 426, and 526 of FIGS. 5-9 in a direction from the first cage wall 170, 270, 370, 470, and 570 to the second surface 186, 286, 386, 486, and 586 of the diffuser 131, 231, 331, 431, and 531. However, in other examples, the direction of flow may be reversed such that fluid flows through the trim assemblies 126, 226, 326, 426, and 526 in a direction from the second surface 186, 286, 386, 486, and 586 of the diffuser 131, 231, 331, 431, and 531 to the first cage wall 170, 270, 370, 470, and 570. Additionally, the cross-sectional areas of the trim assemblies 126, 226, 326, 426, and 526 may represent a cylindrical valve trim, as shown in the first exemplary arrangement of FIGS. 2-4. However, the cross-sectional areas of the trim assemblies 126, 226, 326, 426, and 526 of FIGS. 5-9 may reference a cross-sectional of a different configuration, such as, for example, a flat plate or contoured body that reduces BBSAN.

Other configurations of the trim assemblies 126, 226, 326, 426, and 526 are possible. For example, the cage 130, 230, 330, 430, and 530 of each assembly 126, 226, 326, 426, and 526 may be at least partially formed of a porous body, similar to the porous body 178, 278, 378, 478, and 578 of the diffuser 131, 231, 331, 431, and 531. As such, the cage body 134, 234, 334, 434, and 534 may be entirely or partially formed of a porous material and/or lattice structure. For example, while the passages 162, 262, 362, 462, and 562 formed in the cage 130, 230, 330, 430, and 530 are linear and uniform in cross-section, other exemplary cages constructed in accordance with the teachings of the present disclosure may include non-linear passages or tortuous travel paths (e.g., varying the cross-sectional diameter, zig zag, spiral, angled, with turns, etc.) extending between the wall of the cage 130, 230, 330, 430, and 530, before passing through the diffuser 131, 231, 331, 431, and 531. Similarly, other exemplary diffusers constructed in accordance with the teachings of the present disclosure may include non-linear or tortuous travel paths. While the plurality of passages 162, 262, 362, 462, and 562 of the cage 130, 230, 330, 430, and 530 align with the plurality of pathways 166, 266, 366, 466, and 566 of the diffuser 131, 231, 331, 431, and 531, in other examples, some of the pathways 166, 266, 366, 466, and 566 may not align, thereby forcing some of the fluid through the channels in the porous body 178, 278, 378, 478, and 578.

As explained above, the configuration of the valve trim assembly may not be limited to a sliding stem valve as shown in FIG. 1. In some examples, the trim assemblies 126, 226, 326, 426, and 526 may be positioned downstream from other valve components to reduce BBSAN (see e.g., FIG. 10). The restrictor, for example, may not be a cylindrical cage, and may instead be a plate or other component disposed in the flow path of the control valve of FIG. 1 or other fluid control valves. For example, a trim assembly may be shaped to fit in any fluid passage in a valve, and may or may not entirely or partially surround a control element. For example, a trim assembly may be placed in a valve body outlet or a pipe downstream from a control valve (see e.g., FIG. 10). In another example, a trim assembly may be part of or securely coupled to a control element (see e.g., FIG. 11). In yet another example, a valve trim assembly may be asymmetrical or non-uniform to condition flow only at particular locations of the valve trim assembly and/or related to a particular travel range of a control element. In yet another example, the diffuser may be coupled to an interior surface of a cage instead of an outer surface of the cage as shown in FIGS. 1-5.

Figure 10:
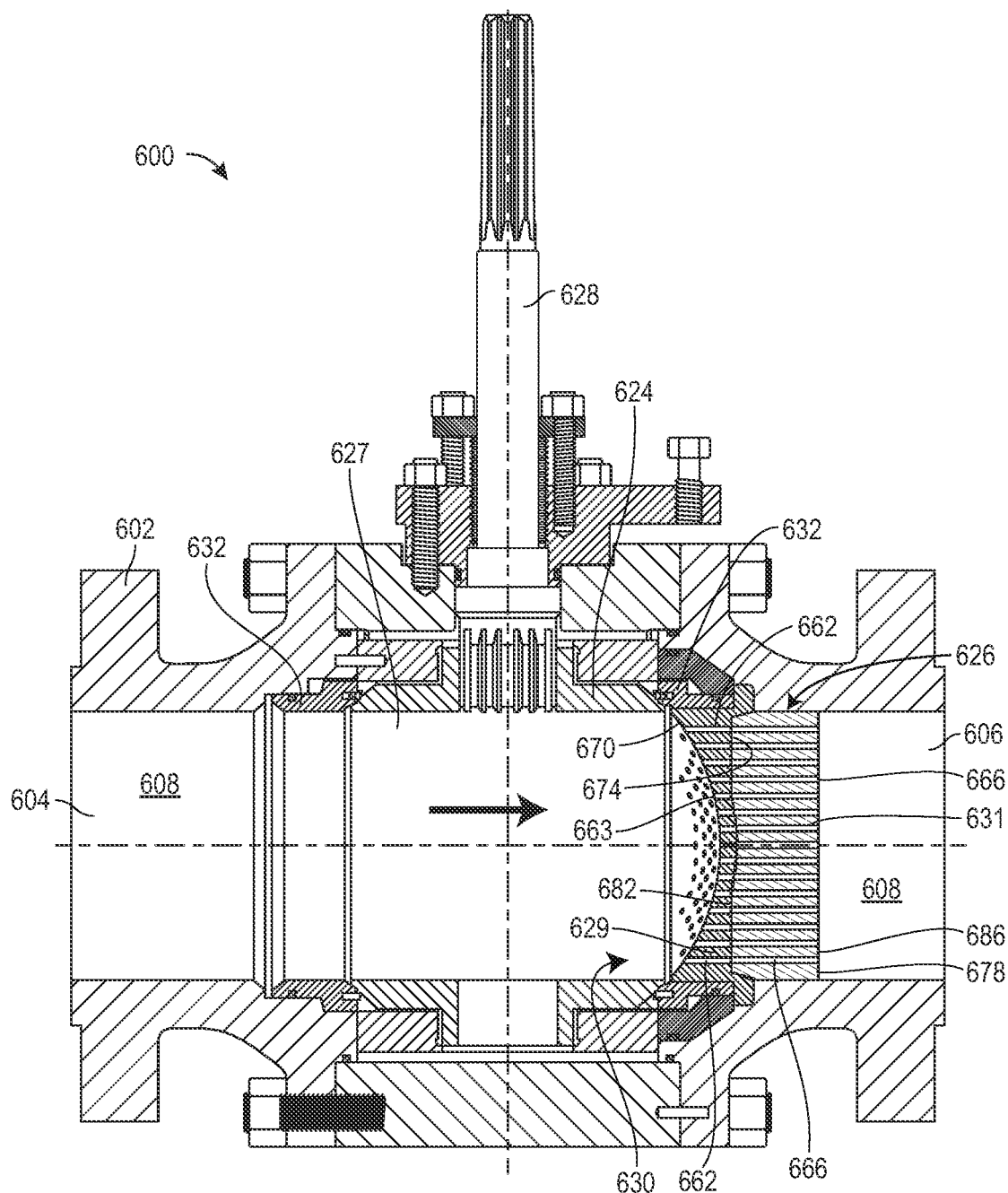
FIG. 10 is a cross-sectional view of a second exemplary control valve with a sixth exemplary valve trim assembly positioned downstream of a fluid control member and assembled in accordance with the teachings of the present disclosure.

Referring to one such example, in FIG. 10 a ball control valve 600 is shown with a sixth exemplary trim assembly 626 and is constructed in accordance with the teachings of the present disclosure. The control valve 600 generally includes a valve body 602 having an inlet 604, an outlet 606, and a passageway 608 disposed between the inlet 604 and the outlet 606. A valve seat 632 is positioned within the valve body 602 and disposed in the passageway 608 between the inlet 604 and the outlet 606. A fluid control member 624, which in this example is a ball having an aperture 627 formed radially through the fluid control member 624, is positioned within the valve body 602 and interacts with the valve seat 632 to control fluid flow through the valve body 602. The fluid control member 624 is movable between a closed position, in which the aperture 627 is not aligned with the fluid flow to inhibit the flow of fluid through the control valve 600, and an open position, in which the aperture 627 is aligned with the fluid flow to allow the flow of fluid through the control valve 600. A stem 628 is connected to the fluid control member 624 at one end and to an actuator at another end, which controls rotational movement of the fluid control member 624.

The sixth exemplary trim assembly 626 of FIG. 10 is positioned within the valve body 602 downstream of the fluid control member 624 to condition the flow of fluid through control valve 600. However, in another example, the trim assembly 626 may be positioned within the aperture 627 of the fluid control member 624. The trim assembly 626 of FIG. 10 may be referred to as an attenuator 630, which includes a restrictor component 629 and a diffuser component 631 arranged to condition fluid flow and reduce BBSAN. Unlike the cage 130 and diffuser 131 of the first exemplary control valve 100 of FIGS. 1-4, the restrictor 629 and diffuser 631 of the sixth exemplary trim assembly 626 may not be cylindrical and do not entirely surround the fluid control member 624. However, any one of the cross-sectional views of the trim assemblies 126, 226, 326, 426, and 526 shown in FIGS. 5-9 may represent a cross-section of the trim assembly 626 of FIG. 10, altered slightly to fit securely downstream of the fluid control member 624 (e.g., the wall defining the restrictor and porous body may be flat instead of curved). In other words, the trim assembly 626 may be a different geometrical structure to reduce BBSAN created by jets flowing through the control valve 600, but may be structurally similar in other respects (e.g., the shape, orientation, and structure of the channels, passages, and pathways).

The sixth exemplary trim assembly 626 is similar to the trim assemblies 126, 226, 326, 326, 426, and 526 described above in many ways. For example, a second wall 674 of the attenuator 630 is coupled to a first surface 682 of the diffuser 631 to align a plurality of passages 662 of the restrictor 629 with a plurality of pathways 666 of the diffuser 631. The plurality of passages 662 of the restrictor 629 extend between a first wall 670 and the second wall 674 of the attenuator 630. The diffuser 631 includes a porous body 678 and the plurality of pathways 666 extend between the first surface 682 and the second surface 686 of the porous body 678. In one example, the porous body 678 may be a lattice structure formed of a plurality of triply periodic surfaces, such as gyroids or gyroid-like surfaces, that form a plurality of channels extending through lattice structure from the first, upstream surface 682 to the second, downstream surface 686. The pathways 666 are formed through the porous body 678 and traverse, intersect, or otherwise extend through at least some of the plurality of channels formed in the lattice structure. Additionally, the porous body 678 of the diffuser 631 in FIG. 10 disrupts the edges of shock cells to reduce BBSAN.

Figure 11:
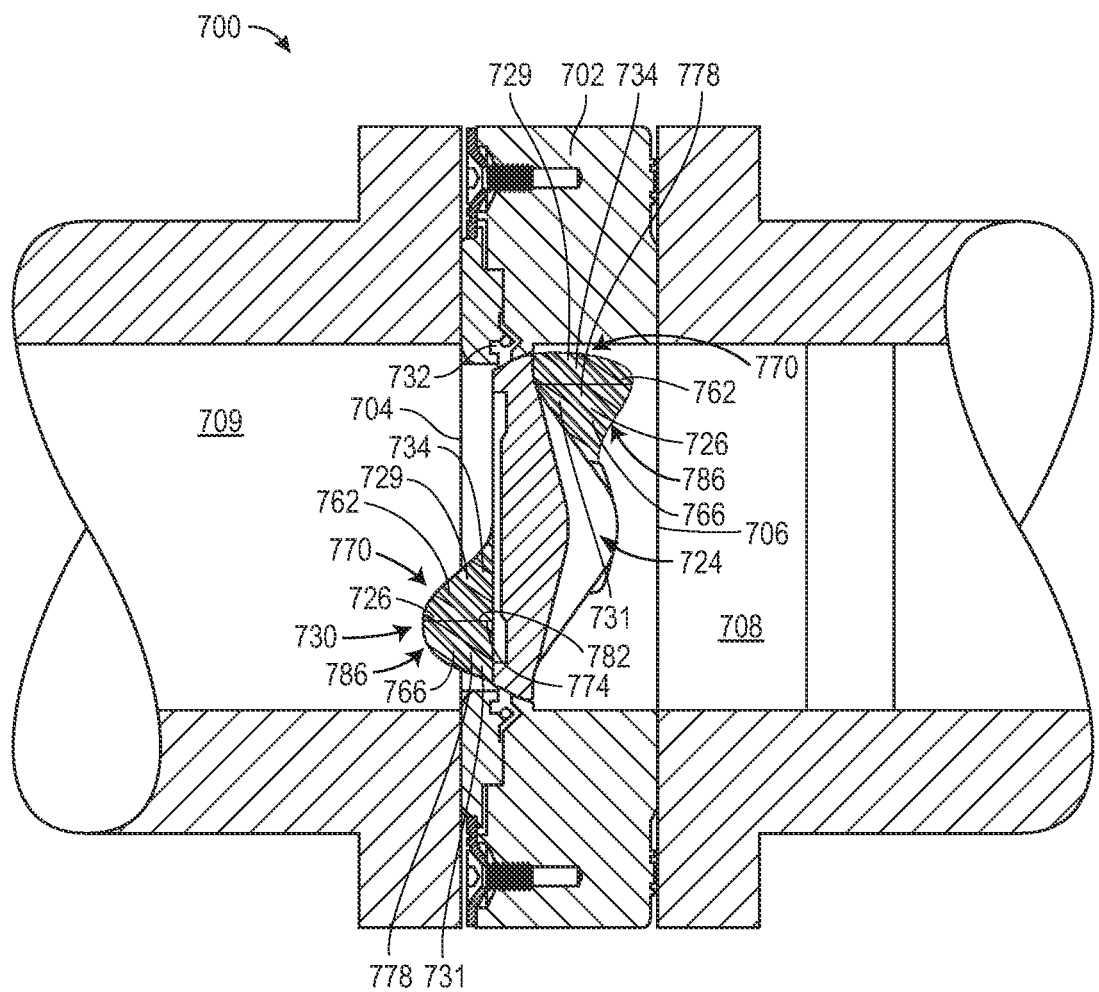
FIG. 11 is a cross-sectional view of a third exemplary control valve with a seventh exemplary valve trim assembly coupled to a fluid control member and assembled in accordance with the teachings of the present disclosure.

In another example, in FIG. 11 a butterfly control valve 700 is shown with a seventh exemplary trim assembly 726 and is constructed in accordance with the teachings of the present disclosure. The third exemplary control valve 700 generally includes a valve body 702 having an inlet 704, an outlet 706, and a passageway 708 disposed between the inlet 704 and the outlet 706. A valve seat 732 is positioned within the valve body 702 and disposed in the passageway 708 between the inlet 704 and the outlet 706. A fluid control member 724, which in this example is a disc, is positioned within the valve body 702 and interacts with the valve seat 732 to control fluid flow through the valve body 702, such that the fluid control member 724 is movable between a closed position, in which the fluid control member 724 engages the valve seat 732 and is perpendicular to the fluid flow to inhibit the flow of fluid through the control valve 700, and an open position, in which the fluid control member 724 is spaced apart from the valve seat 732 and is parallel to the fluid flow to allow the flow of fluid through control valve 700. A stem is connected to the fluid control member 724 at one end and to an actuator at another end, which controls rotational movement of the fluid control member 724.

The seventh exemplary valve trim assembly 726 is also an attenuator 730 and is secured to the fluid control member 724, on opposite sides of the fluid control member 724, to condition the flow of fluid through control valve 700 when the fluid control member 724 is in the open position. The valve trim assembly 726 includes a restrictor component 729 and a diffuser component 731 coupled to the restrictor component 729. Any one of the cross-sectional views of the trim assemblies 126, 226, 326, 426, and 526 shown in FIGS. 5-9 may represent a cross-section of the trim assembly 726 of FIG. 11, altered slightly to fit securely to the fluid control member 724. In other words, the trim assembly 726 may be a different geometrical structure to work with the butterfly valve valve control member 724 to reduce BBSAN created by jets flowing through the control valve 700.

The seventh exemplary trim assembly 726 is similar to the trim assemblies 126, 226, 326, 426, 526, and 626 described above in many ways. For example, a first wall 774 of the attenuator 730 is coupled to a first surface 782 of the diffuser 731 to align a plurality of passages 762 of the restrictor 729 with a plurality of pathways 766 of the diffuser 731. The plurality of passages 762 of the restrictor 729 extend between a second, upstream wall 770 and the first wall 774 of the attenuator 730. The diffuser 731 includes a porous body 778 and the plurality of pathways 766 extend between the first surface 782 and the second, downstream surface 786 of the trim assembly 726. In one example, the porous body 778 may be a lattice structure as described in the previous examples. Additionally, the porous body 778 of the diffuser 731 in FIG. 11 disrupts the edges of shock cells to reduce BBSAN.

In another example, a valve trim assembly similar to the one illustrated in FIG. 10 may be positioned downstream of fluid control member 724 to condition the flow of fluid through the control valve 700 when the fluid control member 724 is in the open position. In another example, the valve trim assembly 626 of FIG. 10 may be disposed downstream and spaced further away from the control member 624.

The exemplary trim assemblies 126, 226, 326, 426, 526, 626, and 726 illustrated and described herein may be entirely or partially manufactured using additive manufacturing techniques, which may be any additive manufacturing technique or process that builds three-dimensional objects by adding successive layers of material on a material. The size and shape of the various flow paths, channels, passages, and pathways through the exemplary trim assemblies 126, 226, 326, 426, 526, 626, and 726 may be customized according to a particular application. Using an Additive Manufacturing Technology process to manufacture trim assemblies/cages for control valves allows the freedom to produce passages having various shapes, geometries, and features that are not possible using current standard casting or drilling techniques.

As used herein, the phrase additive manufacturing technique refers to any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The components of the valve trim assemblies 126, 226, 326, 426, 526, 626, and 726 can be partially (or wholly) made of or manufactured from an erosion-resistant material (e.g., Ultimet, Alloy 6, high-hardness stainless steels such as 420C, 440C, and the like, high-hardness steels such as tool steels, nickel alloys such as Inconel 718, K-Monel, and the like, tungsten carbide, or a ceramic material). In turn, at least part of the diffuser 131, 231, 331, 431, 531, 631, and 731 (e.g., the part of the diffuser exposed to fluid flow) is substantially resistant to erosion from fluid flowing therethrough. In some examples, the diffuser 131, 231, 331, 431, 531, 631, and 731 is wholly made of or from the erosion-resistant material. In other examples, however, the diffuser 131, 231, 331, 431, 531, 631, and 731 can be made of or from two or more different materials, including the erosion-resistant material and one or more suitable materials (e.g., stainless steel, aluminum).

Manufacturing any of the valve trim assemblies 126, 226, 326, 426, 526, 626, and 726 illustrated and disclosed herein may be achieved in a number of ways. A method may include creating a diffuser 131, 231, 331, 431, 531, 631, and 731 by additive manufacturing. For example, the diffuser 131, 231, 331, 431, 531, 631, and 731 may be partially or entirely formed of a lattice structure formed of a plurality of triply periodic surfaces. In another example, the diffuser 131, 231, 331, 431, 531, 631, and 731 may be made using a different manufacturing technique to provide a porous body having a plurality of pathways 166, 266, 366, 466, 566, 666, and 766. The diffuser 131, 231, 331, 431, 531, 631, and 731 includes a first surface 182, 282, 382, 482, 582, 682, and 782, a second surface 186, 286, 386, 486, 586, 686, and 786, a porous body 178, 278, 378, 478, 578, 678, and 778, and a plurality of pathways 166, 266, 366, 466, 566, 666, and 766 extending between the first surface 182, 282, 382, 482, 582, 682, and 782 and second surface 186, 286, 386, 486, 586, 686, and 786. The first surface 182, 282, 382, 482, 582, 682, and 782 of the diffuser 131, 231, 331, 431, 531, 631, and 731 is coupled to a restrictor 129, 229, 329, 429, 529, 629, and 729 such that at least one of the plurality of pathways 166, 266, 366, 466, 566, 666, and 766 of the diffuser 131, 231, 331, 431, 531, 631, and 731 is in fluid communication with at least one of a plurality of passages 162, 262, 362, 462, 562, 662, and 762 of the restrictor 129, 229, 329, 429, 529, 629, and 729. Coupling the diffuser 131, 231, 331, 431, 531, 631, and 731 and the cage/attenuator 130, 230, 330, 430, 530, 630, and 730 may include integrally forming, by an additive manufacturing technique, the restrictor 129, 229, 329, 429, 529, 629, and 729 and the diffuser 131, 231, 331, 431, 531, 631, and 731 together, manufacturing the components separately and then connecting the restrictor 129, 229, 329, 429, 529, 629, and 729 and the diffuser 131, 231, 331, 431, 531, 631, and 731, or directly forming the diffuser 131, 231, 331, 431, 531, 631, and 731, by an additive manufacturing technique, onto a surface of the cage/attenuator 130, 230, 330, 430, 530, 630, and 730.

In high velocity flow environments, BBSAN is often produced when fluid flows through a cage. The exemplary valve trim assemblies 126, 226, 326, 426, 526, 626, and 726 of the present disclosure reduce BBSAN by conditioning the fluid jets as the jets exit the restrictor 129, 229, 329, 429, 529, 629, and 729 and enter the pathways 166, 266, 366, 466, 566, 666, and 766 of the diffuser 131, 231, 331, 431, 531, 631, and 731. This reduction of BBSAN is achieved by coupling the porous body 178, 278, 378, 478, 578, 678, and 778 of the diffuser 131, 231, 331, 431, 531, 631, and 731 to the second wall 174, 274, 374, 474, 574, 674, and 774 of the cage/attenuator 130, 230, 330, 430, 530, 630, and 730, and specifically adjacent to fluid flow exiting the passages 162, 262, 362, 462, 562, 662, and 762 of the restrictor 129, 229, 329, 429, 529, 629, and 729. As fluid jets exit the restrictor 129, 229, 329, 429, 529, 629, and 729, the porous material of the diffuser 131, 231, 331, 431, 531, 631, and 731 surrounds the jets through the pathways 166, 266, 366, 466, 566, 666, and 766, thereby breaking up the edges of the shock cells that create BBSAN. By breaking up the shock cells, the disclosed valve trim assemblies 126, 226, 36, 426, 526, 626, and 726 help reduce noise and extend the useful life of valve components of a control valve or regulator.

A method of manufacturing the trim assembly disclosed herein is also more accurate, customizable, and achieved by using additive manufacturing. Typically, for solid cages and/or diffusers used in applications where the process conditions produce aerodynamic noise, drilled holes through the wall of the cage or attenuator is typically used to form the passages. However, drilling holes is very cumbersome, time consuming, and costly to process. Some drilled hole cages or attenuators may contain thousands of holes and the only real feasible way to produce the passages was to drill them. Acceptance criteria exists that allows a percentage of drill bits to break and be left in the cage and this process requires the use of special drilling machines that have a high degree of accuracy. As such, the method of manufacturing the trim assemblies 126, 226, 326, 426, 526, 626, and 726 reduces costs and time associated with labor, and provides for configurations impossible to construct by merely drilling holes.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A valve trim for use in a fluid flow control device, the valve trim comprising:
    a restrictor defined by a first wall and a second wall coupled to the first wall, the first wall spaced radially inward of the second wall;
    a plurality of first flow characterizing passages formed in the restrictor and extending between the first wall and the second wall;
    a diffuser having a porous body coupled to the second wall;
    a plurality of second flow characterizing passages formed in the porous body of the diffuser; and
    a plurality of channels formed in the porous body of the diffuser, whereby a fluid flow that exits the restrictor via one of the plurality of first flow characterizing passages has a first portion that flows through and exits the diffuser via a corresponding one of the second flow characterizing passages and a second portion that flows through and exits the diffuser via one or more of the plurality of channels.

2. The valve trim of claim 1, wherein at least one of a plurality of second flow passages is coupled to at least one of a plurality of first flow characterizing passages.

3. The valve trim of claim 1, wherein the diffuser is fixedly attached to the restrictor.

4. The valve trim of claim 1, wherein at least one of the plurality of second flow characterizing passages of the diffuser tapers between a first surface of the diffuser adjacent to the second wall of the restrictor and a second surface of the diffuser spaced from the second wall of the restrictor.

5. The valve trim of claim 4, wherein the at least one of the plurality of second flow characterizing passages of the diffuser tapers in a direction toward the second surface of the diffuser.

6. The valve trim of claim 4, wherein the at least one of the plurality of second flow characterizing passages of the diffuser tapers in a direction toward the first surface of the diffuser.

7. The valve trim of claim 1, wherein the porous body comprises a first surface disposed adjacent the restrictor and a second surface spaced outwardly away from the first surface, and wherein each of the plurality of second flow characterizing passages and each of the plurality of channels extend between the first surface and the second surface.

8. The valve trim of claim 1, wherein the porous body comprises a lattice structure having a three-dimensional array of connected structural elements.

9. The valve trim of claim 1, wherein each of the channels defines a flow path that is fluidly isolated from the plurality of second flow characterizing passages.

10. A valve trim for use in a fluid flow control device, the valve trim comprising:
    a restrictor defined by a first wall and a second wall coupled to the first wall, the first wall spaced radially inward of the second wall;
    a plurality of first flow characterizing passages formed in the restrictor and extending between the first wall and the second wall;
    a diffuser having a porous body coupled to the second wall;
    a plurality of second flow characterizing passages formed in the porous body of the diffuser; and
    a plurality of third flow characterizing passages formed in the porous body of the diffuser, whereby a fluid flow that exits the restrictor via one of the plurality of first flow characterizing passages has a first portion that flows through and exits the diffuser via a corresponding one of the second flow characterizing passages and a second portion that flows through and exits the diffuser via one or more of the plurality of third flow characterizing passages.

11. The valve trim of claim 10, wherein at least one of the plurality of second flow characterizing passages of the diffuser tapers between a first surface of the diffuser adjacent to the second wall of the restrictor and a second surface of the diffuser spaced from the second wall of the restrictor.

12. The valve trim of claim 11, wherein the at least one of the plurality of second flow characterizing passages of the diffuser tapers in a direction toward the second surface of the diffuser.

13. The valve trim of claim 11, wherein the at least one of the plurality of second flow characterizing passages of the diffuser tapers in a direction toward the first surface of the diffuser.

14. The valve trim of claim 10, wherein the porous body comprises a first surface disposed adjacent the restrictor and a second surface spaced outwardly away from the first surface, and wherein each of the plurality of second flow characterizing passages and each of the plurality of third flow characterizing passages extend between the first surface and the second surface.

15. The valve trim of claim 10, wherein the porous body comprises a lattice structure having a three-dimensional array of connected structural elements.

16. The valve trim of claim 10, wherein the porous body comprises a lattice structure having a three-dimensional array of connected structural elements.

17. The valve trim of claim 10, wherein each of the third flow characterizing passages defines a flow path that is fluidly isolated from the plurality of second flow characterizing passages.

18. A valve trim for use in a fluid flow control device, the valve trim comprising:
    a restrictor defined by a first wall and a second wall coupled to the first wall, the first wall spaced radially inward of the second wall;

a plurality of first flow characterizing passages formed in the restrictor and extending between the first wall and the second wall;

a diffuser having a porous body coupled to the second wall;

a plurality of second flow characterizing passages formed in the porous body of the diffuser; and a plurality of channels formed in the porous body of the diffuser, each of the channels defining a flow path that fluidly connects one of the first flow characterizing passages with an exit of the diffuser and is fluidly isolated from the plurality of second flow characterizing passages, wherein the porous body comprises a lattice structure having a three-dimensional array of connected structural elements that define the plurality of second flow characterizing passages and the plurality of channels.

* * * * *

UNITED STATES PATENT AND TRADEMARK OFFICE
CERTIFICATE OF CORRECTION

| | | |
|---|---|---|
| PATENT NO. | : 12,215,803 B2 | Page 1 of 1 |
| APPLICATION NO. | : 18/111521 | |
| DATED | : February 4, 2025 | |
| INVENTOR(S) | : Daniel J. Eilers et al. | |

It is certified that error appears in the above-identified patent and that said Letters Patent is hereby corrected as shown below:

In the Specification

At Column 5, Line 40, "(i.e." should be -- (i.e., --.

At Column 6, Line 28, "lays" should be -- lies --.

At Column 7, Line 37, "diameter cross-sectional" should be -- cross-sectional diameter --.

Signed and Sealed this
Sixteenth Day of December, 2025

John A. Squires
*Director of the United States Patent and Trademark Office*